United States Patent [19]

Meyer et al.

[11] 4,334,056

[45] Jun. 8, 1982

[54] METHOD FOR POLYTROPICALLY PRECIPITATING POLYAMIDE POWDER COATING COMPOSITIONS WHERE THE POLYAMIDES HAVE AT LEAST 10 ALIPHATICALLY BOUND CARBON ATOMS PER CARBONAMIDE GROUP

[75] Inventors: Klaus-Rudolf Meyer, Hattingen; Karl-Heinz Hornung, Marl; Rainer Feldmann, Marl; Hans-Jürgen Smigerski, Marl, all of Fed. Rep. of Germany

[73] Assignee: Chemische Werke Hüls AG, Marl, Fed. Rep. of Germany

[21] Appl. No.: 123,030

[22] Filed: Feb. 20, 1980

[30] Foreign Application Priority Data

Feb. 21, 1979 [DE] Fed. Rep. of Germany ....... 2906647

[51] Int. Cl.$^3$ .............................................. C08G 69/46
[52] U.S. Cl. ..................................... 528/496; 525/432; 528/495; 528/310; 528/323; 528/326; 528/325
[58] Field of Search ......................... 528/496, 495, 326

[56] References Cited

U.S. PATENT DOCUMENTS

| | | | |
|---|---|---|---|
| 3,446,782 | 5/1969 | Okazaki et al. | 528/326 |
| 3,484,415 | 12/1969 | Sahler | 528/326 |
| 3,679,638 | 7/1972 | Korsgen et al. | 528/496 |
| 3,879,354 | 4/1975 | Bonner | 528/326 |
| 4,195,162 | 3/1980 | Feldmann et al. | 528/496 |

*Primary Examiner*—Harold D. Anderson
*Attorney, Agent, or Firm*—Wells & Wells

[57] ABSTRACT

Polyamide powder coating compositions for the coating of metals at high temperatures are obtained by the precipitation method from polyamides having at least 10 aliphatically bound carbon atoms per carbonamide group, copolyamides having at least 70% of these polyamides and mixtures of homopolyamides and copolyamides having at least 70% of these polyamides.

A. For the preparation of powder coating compositions useful in the fluidized bed coating method the polyamides with 10 or more carbon atoms and having a relative viscosity between 1.4 and 1.8 are added to at least twice the amount by weight of ethanol and while the mixture is being mechanically mixed in a closed vessel is converted into a solution at temperatures between 130° and 150° C. This solution is adjusted to a precipitation temperature of between 100° and 125° C. while avoiding the formation of local sub-cooling and is agitated under an inert gas atmosphere to suppress boiling. Without further heat supply, powders with a grain size distribution of at least 99.5% by weight between 40 and 250 microns are precipitated at a low angular speed of agitation. When the particle formation is terminated, the suspension formed is cooled to at least 70° C. and following partial mechanical separation of the ethanol, first drying takes place at reduced pressure with wall temperatures at not more than 100° C. with mild mechanical agitation and after the onset of friability the wall temperatures can be increased up to 150° C. with stronger mechanical agitation.

B. For the preparation of powder coating compositions useful in the electrostatic coating method the method of A is modified in the precipitation step by using a higher angular speed of agitation for the purpose of preparing a grain size distribution of 100% by weight smaller than 100 microns.

11 Claims, No Drawings

METHOD FOR POLYTROPICALLY PRECIPITATING POLYAMIDE POWDER COATING COMPOSITIONS WHERE THE POLYAMIDES HAVE AT LEAST 10 ALIPHATICALLY BOUND CARBON ATOMS PER CARBONAMIDE GROUP

CROSS-REFERENCES TO RELATED APPLICATIONS

Applicants claim priority under 35 USC 119 for application P 29 06 647.5-43, filed Feb. 21, 1979 in the Patent Office of the Federal Republic of Germany.

The disclosure of assignee's copending application Ser. No. 924,355, filed July 13, 1978, now U.S. Pat. No. 4,195,162 is incorporated herein to show a method for producing polylauryllactam powder compositions.

BACKGROUND OF THE INVENTION

The field of the present invention is polyamide powders for the coating of metals.

The invention is particularly concerned with methods for preparing powdered coating compositions based on polyamides having at least 10 aliphatically bound carbon atoms per carbonamide group or copolyamides or a mixture of homopolyamides and copolyamides, containing at least 70% of these components. The precipitation process is preferred for preparing the powders.

The state of the prior art of producing polyamide powders may be ascertained by reference to U.S. Pat. Nos. 2,698,966; 2,742,440; 2,975,128; 3,203,822; 3,299,009; 3,476,711; 3,900,607; 3,927,141; 3,966,838 and 4,143,025 and British Patents 535,138; 688,771; 830,757 and 1,392,949, and Kirk-Othmer "Encyclopedia of Chemical Technology" 2nd Ed., Vol. 16 (1968), under the section "Polyamide (Plastics)", pages 88–105, particularly page 62—polylauryllactam (nylon-12), and polyundecanamide (nylon-11), page 101 Solution Processes, and Powder Processing, pages 101–102, the disclosures of which are incorporated herein.

U.S. Pat. No. 2,698,966 discloses physical mixtures of different types of nylon powders produced by dissolving the nylon in organic solvents and precipitating the powdered particles. In Example 14 of U.S. Pat. No. 2,742,440, the solution of epsilon caprolactam in alcohol-water solution and its precipitation as a powder is disclosed. The dispersion of Teflon powder in a solution of epsilon caprolactam and the coprecipitation of the powders is disclosed in U.S. Pat. No. 2,975,128.

The flame spraying and fluidized bed coating of nylon on a metal base is disclosed in U.S. Pat. No. 3,203,822. U.S. Pat. No. 3,299,009 discloses the n-methoxymethylation of nylons, and U.S. Pat. No. 3,410,832 discloses the preparation of polymers and copolymers of lauryllactam.

It is known to use polyamide powder coating compositions for the preparation of varnish-type coatings on metals. The coating operation is conducted in accordance with the fluidized bed coating method, the flame spraying method, or the electrostatic coating method. The polyamide powders are obtained by precipitating the polyamide from solutions as disclosed in British Pat. No. 688,771, or by grinding the polyamide granules, preferably at low temperatures under an inert gas atmosphere.

It is furthermore known to produce polyamide powders by grinding low molecular polyamides and then bringing the thus-obtained powders to the desired relative viscosity or molecular weight by heating them conventionally to temperatures of below the melting point as disclosed in British Pat. No. 535,138 and U.S. Pat. No. 3,476,711.

Polylauryllactam powders are also prepared in accordance with these conventional methods and are used for coating purposes according to methods as disclosed in Chem. Ind., November 1968: 783–791, and Modern Plastics, February 1966: 153–156. Since polylauryllactam powders do not always meet the required conditions of high elasticity, satisfactory edge coating, smooth surface, resistance to alkaline aqueous solutions, and in many cases tend especially to smoke during processing, a large number of improvements have become known, such as plasticizer containing polylauryllactam powders, as disclosed in U.S. Pat. No. 3,900,607, those of a mixture of homopolylauryllactam and lauryllactam-containing copolyamides, as disclosed in British Pat. No. 1,392,949, those containing polyamides with N-alkoxymethyl groups in addition to acid reacting catalysts, as disclosed in U.S. Pat. No. 3,966,838, or mixtures of polyamides having 8–11 aliphatically bound carbon atoms per carbonamide group, aminoplasts carrying alkoxyalkyl groups, and acid reacting catalysts, as disclosed in U.S. Pat. No. 3,927,141. These powders exhibit good properties in individual cases, but do not as yet fully satisfy all of the required conditions.

U.S. Pat. No. 4,143,025 and U.S. Pat. No. 4,195,162 disclose substantially improved processes. These processes, however, still fail to be fully satisfactory because a grinding procedure is applied for obtaining pigment free powders and the production of pigmented powders requires the precipitation method. Lastly, the success of these processes presumes that polylauryllactam granulates were used which were prepared exclusively by hydrolytic polymerization in the presence of specific amounts of phosphoric acid.

SUMMARY OF THE INVENTION

Having in mind the limitations of the prior art, it is an object of the present invention to provide a method of producing powdered coating compositions which are depositable in powder form above their film forming temperature and with a smooth surface, good edge coating, good elasticity and excellent resistance to alkaline aqueous solutions and without generating interfering dense smoke.

A further object of the present invention is to avoid need for using a homopolylauryllactam of a required preparation using the steps of precipitation or grinding.

These objects are accomplished by combining the following selected characteristics:

I. Polyamides having at least 10 aliphatically bound carbon atoms per carbonamide group with a relative viscosity from 1.4 to 1.8 (measured in 0.5% m-cresol solution at 25° C.) are added with at least twice the amount by weight of ethanol and the mixture is dissolved while being mechanically agitated at temperatures between 130° and 150° C. in a closed vessel.

II. Thereupon this solution is adjusted to a temperature between 105° and 125° C. while avoiding local sub-cooling.

(a) Without further heat supply the solution for the preparation of fluidized bed powders with a grain size distribution of at least 99.5% by weight between 40 and 250 microns is stirred at low angular speed until the particle formation is completed.

(b) Without further heat supply the solution for the preparation of electrostatic coating powders with a grain size distribution of 100% less than 100 microns is stirred at high angular speed, until the particle formation is completed.

III. The suspensions so formed are cooled to temperatures below 70° C. and where appropriate, following partial mechanical removal of the ethanol, are dried under reduced pressure at drying apparatus wall temperatures no more than 100° C. with mild mechanical motion, and at the onset of friability can be dried at wall temperatures up to 150° C. with more vigorous mechanical motion.

By stirring at low angular speed is meant the forming of a condition of flow, which lies in the transition field between laminar flow and turbulent flow, corresponding to Reynolds numbers (Re) from about 10 to 100,000. For flat paddle blade agitators in a cylindrical reactor without assemblies where the ratio of reactor diameter to agitator diameter is 2 to 1 Reynolds numbers from about 1,000 to <10,000 are calculated.

By stirring at high angular speed is meant a turbulent flow with Reynolds number $\geq$100. For said flat paddle blade conditions Reynolds numbers are calculated from about 10,000 to <100,000.

By "onset of friability" is meant the transition from slurry to powder at less than 50% ethanol humidity.

By "mild mechanical motion" is meant reshuffling without turbulence (shoveling).

By "more vigorous mechanical motion" is meant a motion with turbulence where the powder is whirled round.

DESCRIPTION OF THE PREFERRED EMBODIMENTS

The polyamides of the present invention include, but are not limited to, polyundecanoic acid amide, polylauryllactam (11 aliphatically bound carbon atoms per carbonamide group) and polyamides with more than 12 aliphatically bound carbon atoms per carbonamide group. Polylauryllactam is preferred. Furthermore, the corresponding copolyamides or mixtures of homopolyamides and copolyamides, which contain at least 70° by weight of the polyamides having at least 10 aliphatically bound carbon atoms per carbonamide group may be used. Accordingly, the mixtures or copolyamides can contain from 0 to 30% by weight of one or several comonomers such as caprolactam, hexamethylene diamine, dodecamethylenediamine, isophoronediamine, trimethylhexamethylenediamine, adipic acid, azelaic acid, sebacic acid, dodecanedioic acid or aminoundecanoic acid. The homopolyamides or copolyamides designated below as polyamides are used in the form of granulates with a relative viscosity between 1.4 and 1.8 (measured in 0.5% m-cresol solution at 25° C.). Preferably, they are produced by hydrolytic polymerization. However, polyamides are useful which are prepared by the activated anionic polymerization method. The polyamides obtained by hydrolytic polymerization are prepared with or without control as regards their molecular weight, that is, in the absence of any chain stabilizers such as acetic acid, benzoic acid, adipic acid, azelaic acid, sebacic acid, dodecanedioic acid and phosphoric acid.

Advantageously a polylauryllactam is used which is prepared in the presence of 0.3 to 0.7% by weight of phosphoric acid, 2 to 10% by weight of water at temperatures between 265° and 300° C. in the absence of any chain stabilizers and under its own pressure developed in a sealed container. Appropriately, there is prior extraction with ethanol or methanol.

Exclusively ethanol is used as the solvent for the precipitation process of the present invention. Besides water free ethanol, commercial alcohol is useful as ethanol, which may contain up to 4% by weight of water and conventional denaturants such as methylethylketone, petroleum ether and pyridine. The ethanol is used at least in twice the amount by weight of the polyamide. Advantageously, twice to five times as much ethanol is used for fluidized bed powders and from four to seven times for electrostatic powders, in particular, four times and 5.6 times, respectively. In other words, the concentration of the polyamide in the solution is at most 33⅓% by weight, advantageously from about 25 to 12.5%, especially about 20 and 15% by weight respectively. In these ranges of concentration, easily stirred solutions are obtained upon precipitation, and further there is good heat drain. Table 1 shows the advantages of the selected ethanol.

To implement the process, the mixture of polyamide and ethanol is appropriately raised to the temperature of dissolution in wall heated mixing vessels. The temperature of dissolution lies between about 130° and 150° C., preferably it is 140°±2° C. The rate of raising the temperature is not critical. The heating can be carried out by means of heat elements in the casing or advantageously using low pressure steam or also high pressure steam in the walls, particularly for larger vessel volumes. The rate of stirring during the dissolution process does not affect the grain size distribution. Thereupon, the solution is brought to the temperature of precipitation. The precipitation temperature is within the range of about 100° to 125° C., preferably within the range from about 120° to 110° C. The adjustable precipitation temperature range depends on the size of the vessel, because as the reactor increases in size, the heat exchange surface per unit volume for removing the heat of precipitation decreases. The cooling procedure to the precipitation temperature can be carried out either by distilling off ethanol, by evacuating the cold condensate to prevent local subcooling, in this case the amount distilled off must be additionally taken into account when setting the quantitative ratio of polyamide to ethanol, or by reflux cooling. In the case of reflux cooling, the condensate flowing back must be at approximately the boiling point to avoid local subcooling of the solution, or by cooling through the wall. In the case of cooling through the wall, the heat-carrying medium's temperature may not drop below, or only slightly below, the temperature desired for the precipitation process. A combination of cooling methods is also useful. Cooling by distillation is preferred for larger pieces of apparatus. The subcooling of the casing contents with respect to the reactor contents may be larger depending on how poorly the medium is suited for heat drainage. When the vessel is steam heated, the jacket can be wholly decompressed after the polyamide is dissolved, and further application of steam will not be necessary. In the case of setting the temperature with a liquid heat carrier, slight subcooling can lead to a coating on the wall and less favorable grain size distribution. After the desired precipitation temperature has been reached, the distillation procedure is terminated. As regards the further course of the precipitation procedure, the inside temperature advantageously is not controlled, rather the precipitation proceeds as a polytropic process, in which only part of the heat of precipitation released is drained through the jacket and the reactor cover, while the other part causes a temporary rise in temperature from 0.5° to 3° C. in the reactor. This process preferably is achieved by a constant jacket temperature and by constant heat losses through the reactor cover. The magnitude of the heat losses is decisive for the rate of precipitation. The duration of the precipitation process is from 2 to 12 hours, preferably between 5 and 7 hours.

An inert gas, preferably nitrogen, is introduced into the reactor to prevent boiling. There is substantial flow due to the stirring means during the precipitation process. Flow must be kept up for the coarser fluidized bed powders, the motion taking place at the boundary of sedimentation of precipitated polyamide powder, this being achieved by a low angular speed. To achieve as smooth a flow as possible, flow impeding parts should be eliminated. As regards the finer powders for electrostatic application, the flow on the other hand should be as turbulent as possible, this being achieved by a correspondingly high angular speed of stirring. Suitable stirring means therefore are straight-arm paddle mixers, anchor agitators and flat paddle blade agitators, preferably the latter, of which the angular speed can be varied. The dimensions of the flat paddle blade agitators are in the range of reactor-diameter/flat-blade diameter=2/1.

The suspension so obtained at the completion of the precipitation process is cooled through the wall or by means of distillation or is transferred directly as a suspension into a drier. Drying is carried out under reduced pressure and wall temperatures less than 100° C. until the friability setting at 20% ethanol humidity is attained, with safe mechanical motion, for instance in slowly running paddle or tumbling driers, to prevent forming coarse material by agglomeration. Upon achieving friability, the mechanical motion can be made more intense and the temperature in the drier can be raised above 100° C. up to 150° C.

The typical average grain size distribution for fluidized bed powders is characterized in that at least 99.5% of the polyamide used covers the range from 40 to 250 microns.

The process of the invention therefore permits the selective preparation of both fluidized bed powders and powders for electrostatic coating. When coating metals, the powders evidence excellent properties of elasticity and edge-coating, further are also resistant to alkaline aqueous solutions.

Furthermore, the powders do not smoke in processing. No coarse material is obtained in precipitation. A certain coarsening may take place during processing in the drier, but this is of advantage because the fine proportion in the fluidized bed powders is decreased further or disappears practically entirely. For reasons of reliability, a protective screen may be inserted in series, to remove any components larger than 250 microns in fluidized bed powders and exceeding 100 microns as regards electrostatic powders. As regards fluidized bed powders, any fine portion still present may be removed, for instance in centrifugal air separators.

The precipitation may also be carried out in the presence of pigments such as titanium dioxide, lamp-black, $BaSO_4$, ZnS, cadmium red, iron oxide or stabilizers such as 4-hydroxy-3,5-di-tert.-butyl-phenylpropionic acid, 4-hydroxy-3,5-di-tert.-butyl-phenylpropionic-acid-hexamethylenediamine-bisamide, propionic acid esters with an aliphatic alcohol having 1 to 18 carbon atoms, tris-alkylphenyl esters, tris-alkyl esters, tris-aryl esters or mixed esters of phosphrous acid, of which alkyl groups contain from 1 to 16 carbon atoms and is straight chained or branched.

EXAMPLE 1

400 kg of polylauryllactam which was hydrolytically polymerized in the presence of 0.5% by weight of phosphoric acid, with an extract content of 0.6% by weight and a relative viscosity of 1.62, are heated together with 2,200 liters of ethanol denatured by methylethylketone, the water content being 1% by weight, in a 3 $m^3$ reactor (1,600 mm diameter) to 140° C. Then the solution is cooled by distilling about 200 liters of ethanol into an external condenser to 117° C. Simultaneously the jacket temperature is set at 111.5° C. by a controlled low pressure steam, nitrogen (2 bars) is applied to the solution, and the angular speed of the flat blade paddle agitator (800 mm diameter) is reduced to 20 rpm. ($Re_{117° C.}$ about $3.10^3$) in the course of 2½ hours, the inside reactor temperature drops to 116° C., then rises by 1° C. within 3 hours and passes after a total of 9 hours into a temperature gradient of −0.5° C./hour corresponding to a fully reacted system. The suspension so obtained is then cooled through the jacket to 45° C. and dried in a paddle drier (1,376 mm diameter) at 2 rpm, 200 torr and a jacket temperature of 90° C. to a residual humidity of less than 0.2%. The grain size distribution obtained by an image analyzer commercial name micro Video mat, Carl Zeiss, designation: particle size analyzer is as follows:

| <40 microns | 0.28% by weight |
| --- | --- |
| <80 | 18 |
| <120 | 79 |
| <160 | 100 |

EXAMPLE 2

Contrary to example 1, the steam supply to the reactor casing is shut off during the cooling by distillation and the casing is decompressed to atmospheric pressure. Thereupon $N_2$ (2 bars) is applied to the solution and the angular speed of the flat blade paddle agitator is reduced to 20 rpm. ($Re_{117° C.}$ about $3.10^3$). In the course of 1½ hours the inside temperature drops to 115° C., then within one hour rises again by 0.5° C. and after a total of 4.5 hours passes into a temperature gradient of −1° C./h corresponding to the fully reacted system. The suspension so obtained is then treated as in example 1. The grain size distribution measured by an image analyzer is as follows:

| <40 microns = | 0.3% by weight |
| --- | --- |
| <80 | 12.1 |
| <120 | 78 |
| <160 | 97 |
| <200 | 100 |

EXAMPLE 3

340 kg of polylauryllactam hydrolytically polymerized in the presence of 0.5% by weight of phosphoric acid, with an extract content of 0.24% by weight, a relative viscosity of 1.58, are heated together with 2,100 liters of ethanol denatured by methylethylketone and a water content of 1.7% by weight in a 3 m³ reactor (1,600 mm diameter) to 140° C. 20.4 kg of TiO$_2$ dispersed in 160 liters of ethanol are added to the solution being formed. The white-pigmented polylauryllactam solution is cooled to 117° C. by distilling off 200 liters of ethanol. Simultaneously the temperature in the jacket is reduced by a controlled low pressure steam to 111.5° C. Thereupon N$_2$ (2 bars) is applied to the reactor contents and the angular speed of the flat blade paddle agitator with a diameter of 800 mm is decreased to 20 rpm. (Re$_{117° C.}$ about 3.10³). In the course of 4 hours the inside temperature drops to 115.25° C., then rises within 2½ hours again by 0.5° C. and after a total of 9 hours passes into the temperature gradient of −0.5° C./h corresponding to the fully reacted system. The processing of the suspension so obtained takes place as in example 1. The grain distribution obtained by the image analyzer is as follows:

| | |
|---|---|
| <40 microns | 0.38% by weight |
| <80 | 3.14 |
| <120 | 49.3 |
| <160 | 98.25 |
| <200 | 100 |

EXAMPLE 4

400 kg of polylauryllactam polymerized in the absence of phosphoric acid and with an extract content of 0.39% by weight and a relative viscosity of 1.46 are heated together with 2,200 liters of ethanol denatured by methylethylketone with an H$_2$O content of 1.1% by weight in a 3 m³ reactor (1,600 mm diameter) to 140° C. The solution is cooled to 117° C. by distilling off about 200 liters of ethanol and simultaneously the jacket temperature is reduced by controlled low pressure steam to 106.5° C., N$_2$ (2 bars) is applied to the solution, and the angular speed of the flat blade paddle agitator (800 mm diameter) is set for 50 rpm. (Re$_{117° C.}$ about 7,5.10³). The inside temperature drops to 115.25° C. in the course of two hours, then rises again within 2 hours by 1.25° C. and after 6 hours passes into the temperature gradient of −1° C./h, corresponding to the fully reacted system. The processing of the suspension so obtained is carried out as in example 1.

The grain size distribution obtained by sifting analysis is as follows:

| | |
|---|---|
| <32 microns | 18.2% by weight |
| <45 | 92.8 |
| <60 | 99.7 |
| <100 | 100 |

EXAMPLE 5

275 kg of a mixture made of of a part of lauryllactam polymerized in the absence of phosphoric acid and of a part of copolyamide consisting of 80% of lauryllactam and 20% of caprolactam components, with an extract content of 0.17% by weight and a relative viscosity of 1.68 together with 2,000 liters of ethanol denatured by methylethylketone with a H$_2$O content of 1.5% by weight are heated in a 3 m³ reactor (1,600 mm diameter) to 140° C. The solution is cooled to 117° C. by distilling off about 200 liters of ethanol, and simultaneously the jacket temperature is reduced to 107° C. by controlled low pressure steam, N$_2$ (1 bar) is applied to the solution, and the angular speed of the flat blade paddle agitator (800 mm diameter) is set to 50 rpm. (Re$_{117° C.}$ about 2.10⁴). The inside temperature drops to 115° C. in the course of 2 hours, then remains constant for 1½ hours and then passes into a temperature gradient of −1.5° C./h corresponding to a fully reacted system. The processing of the suspension takes place as in Example 1, but at a jacket temperature of the dryer reduced to 60° C. The grain size distribution ascertained by means of image analysis is:

| | |
|---|---|
| <35 microns | 4% by weight |
| <45 | 20 |
| <60 | 55 |
| <100 | 100 |

TABLE 1

| Solvents (industrially pure) | Boiling point (°C.) | Polyamide-12 Concen. % by wt $\eta$rel 1.62 extract | Onset of dissolution (°C.) | (°C.) upper end | Precip. temp. (°C.) | Agitation rpm | Dissolved Product | Product After Precipitation and cooling | Grain size microns |
|---|---|---|---|---|---|---|---|---|---|
| Methanol | 65 | 10 | 125 | 130 | 114 | 150 | 2 liquid phases | Coarse powder suspension | 20–600 |
| | | 20 | | | | 50 | Slightly cloudy solution | Broken-up cake, clumps and cake clods sinter and harden when dried, solvent completely absorbed, white-opaque | — |
| Ethanol | 78 | 20 | 120 | 140 | 110 | 50 | Slightly cloudy solution | Powder suspension, white | 5–300 |
| | | 25 | 120 | 140 | 112 | 50 | Slightly cloudy solution | On the boundary between boundary suspension and solvent fully absorbed by powder, white | 5–300 |
| | | 30 | 120 | 140 | 114 | 100 | Slightly cloudy solution | Dry powder, solvent completely absorbed, white | 5–300 |
| | | 40 | 120 | 140 | 116 | 100 | Slightly cloudy solution | Dry powder agglomerate, solvent completely absorbed, white opaque | — |
| i-Propanol | 82 | 20 | 135 | 150 | 119 | 250 | 2 liquid phases | Clumpy suspension, white, pronounced caking | 10–160 |
| n-Propanol | 97 | 20 | 115 | 140 | 114 | 50 | Slightly cloudy | Broken up cake, solvent completely | — |

TABLE 1-continued

| Solvents (industrially pure) | Boiling point (°C.) | Polyamide-12 Concen. % by wt ηrel 1.62 extract | Onset of dissolution (°C.) | (°C.) upper end | Precip. temp. (°C.) | Agitation rpm | Dissolved Product | Product After Precipitation and cooling | Grain size microns |
|---|---|---|---|---|---|---|---|---|---|
| | | | | | | | solution | absorbed, white opaque | |
| i-Butanol | 108 | 20 | 125 | 140 | 119 | 50 | Slightly cloudy solution | Broken up cake, solvent completely absorbed, white opaque | — |
| Ethyldiglycol | 123 | 20 | — | 150 | — | 50 | Coffee-brown solution | Suspension, powder deep brown but lighter than in dissolved state | — |
| Ethylbutanol | 146 | 20 | — | 142 | 128 | 50 | Very cloudy solution | Broken up cake, solvent completely absorbed, white opaque | — |
| Dimethylformamide | 153 | 20 | 130 | 150 | 126 | 50 | Slightly cloudy solution | Broken up cake, solvent completely absorbed, white opaque | — |
| | | 33 | 130 | 150 | 130 | 50 | Very cloudy viscous solution | Broken up cake, solvent completely absorbed, white opaque | — |
| Cyclohexanol | 161 | 20 | — | 140 | 114 | — | Intensely yellow-green solution | Broken up cake, solvent completely absorbed, white opaque | — |

We claim:

1. A method of producing polyamide powder from polyamide having a relative viscosity of 1.4 to 1.8 as measured in 0.5% meta-cresol solution at 25° C. and at least 70% of said polyamide consisting of polyamide with at least 10 aliphatically bound carbon atoms per carbonamide group, comprising:
   (a) dissolving said polyamide in at least twice the amount by weight of ethanol in a closed vessel at a temperature between about 130° to 150° C. to form a solution of said polyamide;
   (b) cooling said solution to a precipitation temperature between about 100° and 125° C. and ceasing said cooling at said precipitation temperature;
   (c) precipitating said polyamide powder from said cooled solution of (b) polytropically with agitation and under an inert gas atmosphere; and
   (d) separating said precipitated polyamide powders of (c) from said ethanol.

2. The method of claim 1, wherein said precipitation is carried out with a low angular speed of agitation and said polyamide powder has a grain distribution size of at least 99.5% by weight between 40 and 250 microns useful for fluidized bed coating.

3. The method of claim 1, wherein said precipitating is carried out with a higher angular speed of agitation and said polyamide powder has a grain distribution size of 100% by weight smaller than 100 microns useful for electrostatic coating.

4. The method of claim 1, wherein said agitation of step (c) is continued until particle formation is terminated and a suspension is formed and step (d) is carried out by further cooling said suspension to at least 70° C., with ethanol is mechanically separated, a first drying is carried out at reduced pressure with a drying apparatus wall temperature of not more than about 100° C. with mechanical agitation until onset of friability and a second drying may follow at reduced pressure with a drying apparatus wall temperature of not more than about 150° C. and with mechanical agitation.

5. The method of claim 2, wherein the ethanol concentration of step (a) is two to five times the amount by weight of said polyamide.

6. The method of claim 3, wherein the ethanol concentration of step (a) is four to seven times the amount by weight of said polyamide.

7. The method of claim 1 wherein the concentration of said polyamide in said ethanol of step (a) is about 25 to 12.5% by weight.

8. The method of claim 1, wherein the concentration of said polyamide in said ethanol of step (a) is about 20 to 15% by weight.

9. The method of claim 1, wherein the temperature of step (a) is 138° to 142° C. and the temperature of step (b) is 110° to 120° C.

10. The method of claim 2, wherein said low angular speed forms a condition of flow corresponding to Reynolds numbers from about 1,000 to less than 10,000.

11. The method of claim 3, wherein said higher angular speed forms a condition of flow corresponding to Reynolds numbers from about 10,000 to less than 100,000.

* * * * *